United States Patent [19]
McComas

[11] Patent Number: 5,017,402
[45] Date of Patent: May 21, 1991

[54] METHOD OF COATING ABRADABLE SEAL ASSEMBLY

[75] Inventor: Charles C. McComas, Palm City, Fla.

[73] Assignee: United Technologies Corporation, Hartford, Conn.

[21] Appl. No.: 287,221

[22] Filed: Dec. 21, 1988

[51] Int. Cl.⁵ .............................................. B05D 1/00
[52] U.S. Cl. .................................................. 427/34
[58] Field of Search ........................................ 427/34

Primary Examiner—Bernard Pinalto
Attorney, Agent, or Firm—Charles E. Sohl

[57] ABSTRACT

Adverse interactions during initial interactions between abradable seal components are minimized by applying a coating to the moving seal component. The coating is nonreactive with the abradable material and provides lubricity during initial seal operation.

1 Claim, 1 Drawing Sheet

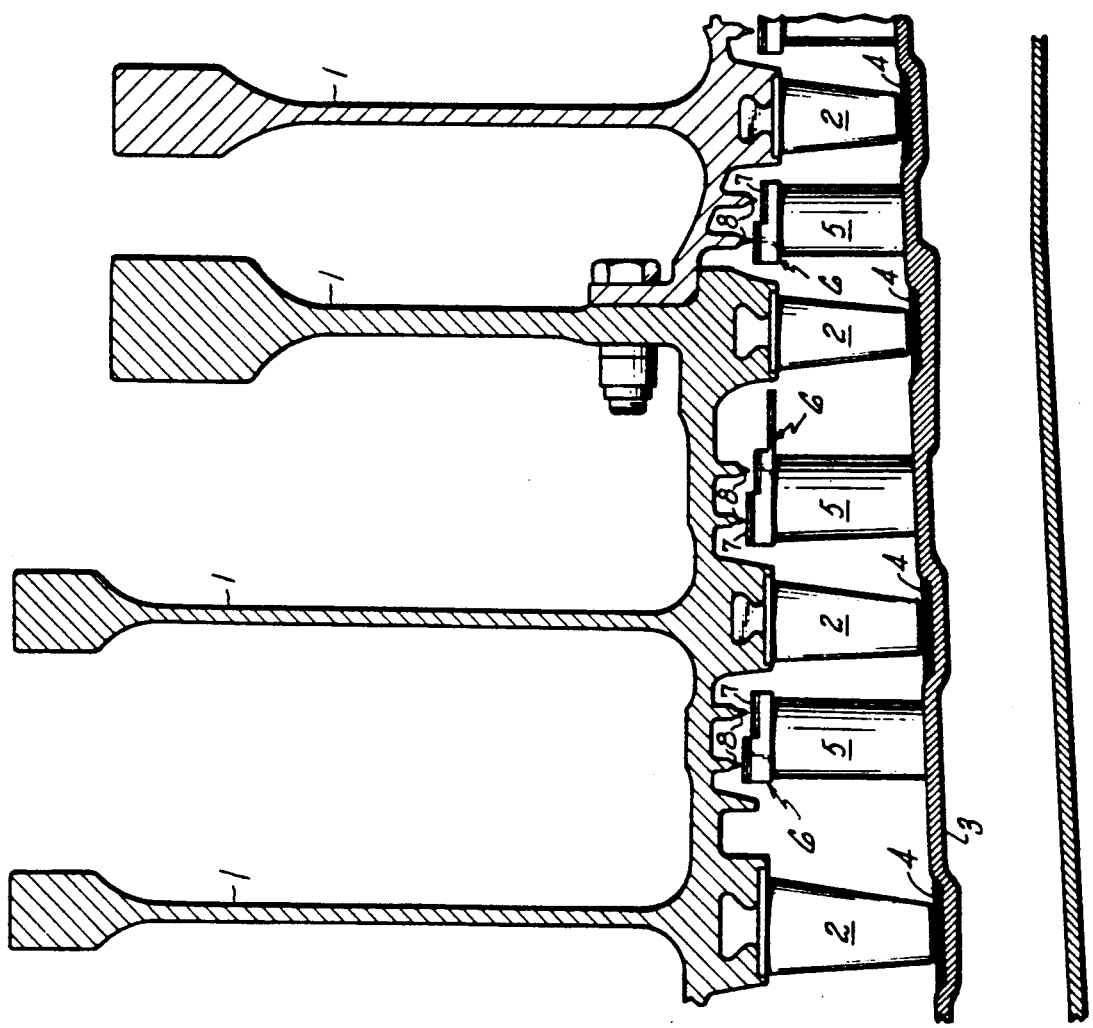

METHOD OF COATING ABRADABLE SEAL ASSEMBLY

DESCRIPTION

1. Technical Field

This invention relates to the field of gas turbine engines abradable seals. This invention relates to the reduction of detrimental initial interactions in an abradable seal system.

2. Background Art

Gas turbine engines find wide application as sources of power, particularly in the aircraft industry. Such engines consist of a compressor section which compresses air to moderate pressure, moderate temperature conditions. A combustor section combines fuel with the compressed air and a turbine section extracts useful power from the products of combustion. The turbine section feeds power back to the compressor section and optionally to external loads. In a common form of gas turbine engine, the turbine section also powers a fan section which provides added thrust.

The efficiency of the engine can be increased by insuring that air flows only where it is desired to have it flow and that leakage, for example around blade tips and vane ends is minimized. The sealing task is made more difficult because the turbine engine components expand and contract with temperature and clearances change with varied load conditions. Currently abradable seals are widely used. An abradable seal consists of a brittle, frangible material, usually a weakly bonded particulate composite, which (in theory) breaks cleanly away rather than flowing or smearing when it interacts with the moving blade tip or vane end. The abradable seal system comprises an abradable structure (usually stationary) in combination with a moving component which interacts with the abradable to cut a groove therein. The moving component, during normal operation, operates in the groove thus achieving a good measure of sealing.

The task of finding the proper abradable and abrasive combination for operation at elevated temperatures is a demanding one especially when reasonable fabrication costs are also required.

U.S. Pat. Nos. 3,413,136, 3,879,831, 3,844,011, and 3,147,087 describe typical abradable seal systems which are designed for interaction with a variety of moving components. The abrasive portion is added to insure that wear occurs on the abradable component rather than on the moving blade tip or knife-edge seal. The optimum combination of abradable and abrasive has not yet been found. There are still substantial problems which occur when the abradable and abrasive do not interact properly, but instead the abradable interaction occurs in a smearing or a ductile fashion causing adherence and buildup of deposits on the abrading surface. Once this type of behavior starts it will persist because the deposit on the abrading surface is wettable by and attractive to the abradable seal constituents. Any wetting of the rotating member by the seal material will have subsequent detrimental effects—even to the extent of causing sufficient imbalance to cause vibration and eventual fatigue cracking.

It is an object of the invention to provide an abradable and abrasive system along with a transient intermediate coating which provides for minimal interaction, with minimal material transfer from the seal to the rotating member especially during the initial contact between the abrasive surface and the abradable seal.

DISCLOSURE OF INVENTION

It has been noted that most of abrasive—abradable interaction occurs during the initial few seconds or minutes of engine operation. It is during this brief initial period that the great volume of abradable material is abraded and during this period of time the interaction between the abrasive and abradable sets the tone for succeeding engine operation and sea behavior.

According to the present invention a conventional abradable seal can have its interaction with an abrasive surface substantially modified through the interposition of a transient coating on the surface of the moving component prior to initial engine operation.

According to one form of the prior art an abrasive material can be plasma sprayed on blade tips and knife-edge seals. This material consists of an oxidation and corrosion resistant matrix containing abrasive material selected from the group consisting of carbides, nitrides, and oxides. This abrasive will interact with an abradable seal of a conventional type, for example that shown in U.S. Pat. Nos. 3,413,136, 3,879,831, 3,844,011, and 3,147,087. According to past experience with this type of technology such combinations have not been entirely satisfactory because adverse interactions have occurred.

According to the invention these interactions are substantially reduced by depositing on the surface of the abrasive a colloidal suspension of a ceramic material which is not wettable by the abradable material during high temperature interactions; thus minimizing transfer and adherence of abradable material to rotating component. Typical materials include $Al_2O_3$, $MgO$, $ZrO_2$ $Si_3N_4$ and $BN$. The adverse provision of such material greatly reduces the interaction during the first moments of engine operation. If adverse interactions can be avoided during initial engine operation, abradable seal system which would otherwise be unsatisfactory can be satisfactory for the substantially less demanding interactions which occur during routine engine use.

The interaction reduction apparently results from reductions in frictional heating (the fine particles provide some lubricity) in combination with the nonwetting nature of the materials.

The foregoing and other features and advantages of the present invention will become more apparent from the following description and drawing.

BRIEF DESCRIPTION OF THE DRAWING

The FIGURE is a cross-section through a portion of a gas turbine engine illustrating typical seal structures.

BEST MODE FOR CARRYING OUT THE INVENTION

The present invention relates to seals using in gas turbine engines, particularly those of the axial flow type. Such engines include alternate rows of stationary vanes and moving blades with the blades being attached at the periphery of shaft mounted rotating disks.

The FIGURE illustrates a cross-section of a portion of a modern gas turbine engine. Components important to understanding the present invention include a plurality of rotatable disks 1 upon whose outer periphery are mounted a plurality of blades 2. The blades rotate within the inner case 3 and are closely spaced thereto. Minimum leakage between the blades and the inner case is achieved by the provision of a seal 4 (the outer air seal), mounted on the inner case.

Mounted within and upon the inner case 3 are a plurality of vanes 5 on whose inner, free ends 6 is mounted another seal 7 (the inner air seal) which is closely spaced to knife edges 8 mounted on extensions of the disks 1. The knife edge 8 and inner air seal 7 cooperate to reduce leakage and improve efficiency. In an alternate engine scheme, the disks do not have integral projections, but are separated by spacers upon which knife edges may be mounted.

The seals for which the present invention is particularly suited are located on the inner case 3 adjacent the free ends of the blades 2 (the outer air seal), and on the free ends 6 of the vanes 5 (the inner air seal). The seals of the present invention are preferably mounted on stationary substrates arranged to engage moving components.

The invention comprises the improved use of conventional seal materials which have been tried in the prior art with erratic results. The invention brings success these previously less than successful combinations through the interposition of an initial intermediate coating which greatly reduces adverse and detrimental interactions between the abrasive and abradable during initial engine run. The abradable seal may be for example selected from the teachings of U.S. Pat. Nos. 3,413,136, 3,879,831, 3,844,011, and 3,147,087 which are incorporated herein by reference.

Alumina is a well known ceramic used at high temperatures and has a characteristic of being generally nonreactive or nonwetting with metal alloys of the type which are used in the abradable structures and the abrasive surfaces. By insuring that such a nonwetting, nonreactive material is present during the initial rub between the abrasive and the abradable the initial interaction will be a nonwetting interaction and the problems which often occur during initial engine run will be minimized. The invention includes functionally equivalent nonwettable ceramics which are stable to at least 3000° F. including $Al_2O_3$, MgO, $ZrO_2$, $Si_3N_4$ and BN. Particle sizes are preferably less than 10 microns and the coating thickness should exceed 1 mil.

The abradable surface which interacts with this abradable seal material can be provided by coplasma spraying an abrasive substance selected from the group consisting of carbides and oxides and more specifically WC, $Cr_2C_3$, $Si_3N_4$, $Al_2O_3$, SiC, and mixtures thereof with a binder material.

The binder, if employed, is selected to be essentially nonreactive, i.e. nonwettable by, with the abrasive. In the case of tungsten carbide, a powder mixture comprising about 88 weight percent of tungsten carbide and about 12 weight percent of a cobalt binder has been utilized while in the case of the chromium carbide abrasive layer, a powder containing about 75 weight percent of $Cr_3C_2$ and about 25 weight percent of an alloy comprised of 80% nickel and 20% chrome has been utilized. It will often be found desirable to employ an initial bond coat to ensure that the abrasive material adheres to the substrate; such a bond coat may, for example, comprise the same of similar alloys to that employed as the matrix material or binder material in connection with the abrasive material. Other bond coats may be employed including alloys of the MCrAl type, where M is a material selected from the group consisting of iron, nickel, cobalt and mixtures thereof; Cr is chromium in an amount of from about 5% to 25% by weight; and Al is aluminum in an amount from about 5% to about 20% by weight. Reactive metals such as Y, La, Sc, Hf and the like may be added in amounts on the order of 0.1% to 2%.

It is the abradable material which primarily adversely interacts with the abrasive coating and it is this reaction at high temperatures between the abrasive and the abradable which is prevented by the transient alumina coating of the present invention. The present invention coating can be applied most advantageously as a colloidal suspension either an aqueous or organic, i.e. cellulose nitrate based, or conceptually could be applied by a very light plasma spray coating. We have used liquid applications with success.

Although this invention has been shown and described with respect to detailed embodiments thereof, it will be understood by those skilled in the art that various changes in form and detail thereof may be made without departing from the spirit and scope of the claimed invention.

I claim:

1. In the method of coating an initial assembly of an abradable seal system including an abradable seal located and adapted to interact with a relatively moving engine component, the improvement which comprises:
   applying a thin layer of colloidal ceramic particles to the moving component, said ceramic particles being nonwettable by the abradable seal constituents, whereby adverse interactions between the seal and the moving component are minimized during initial engine operation.

* * * * *